United States Patent [19]

Kwong

[11] Patent Number: 5,552,353
[45] Date of Patent: Sep. 3, 1996

[54] PROCESS FOR PRODUCING ADVANCED CERAMICS

[75] Inventor: Kyei-Sing Kwong, Tuscaloosa, Ala.

[73] Assignee: The United States of America as represented by the Secretary of the Interior, Washington, D.C.

[21] Appl. No.: 341,227

[22] Filed: Dec. 5, 1994

[51] Int. Cl.$^6$ .................... C04B 35/565; C04B 35/584
[52] U.S. Cl. ................... 501/89; 501/92; 501/97; 501/98
[58] Field of Search .................. 501/89, 97, 98, 501/92

[56] References Cited

U.S. PATENT DOCUMENTS

| | | | |
|---|---|---|---|
| 4,360,506 | 11/1982 | Paris et al. | 501/128 X |
| 4,499,193 | 2/1985 | Phelps et al. | 501/98 |
| 4,652,436 | 3/1987 | Kato | 423/406 |
| 5,011,799 | 4/1991 | Das Chaklander et al. | 501/89 |
| 5,096,858 | 3/1992 | Das Chaklader et al. | 501/89 |
| 5,108,967 | 4/1992 | Phelps et al. | 501/98 |
| 5,110,773 | 5/1992 | Corral et al. | 501/98 |
| 5,411,762 | 5/1995 | Thebault et al. | 501/98 X |

OTHER PUBLICATIONS

Chaklader, A. C. D, et al, "Al$_2$O$_3$–SiC Composites From Alumino–Silicate Precursors", J. Am. Ceram. Soc. 75(8)2283–85 (1992).

Lee, et al "Sinterable SiAlON Powder by Reaction of Clay With Carbon and Nitrogen" Am.Ceram.Soc. Bull. v. 58, No. 9, 1979.

Solomon, D. H. et al, "Reactions Catalyzed by Minerals, Part I Polymerization of Styrene", J. App. Polymer Sci. v. 9, P1261, 1965.

Sugahara, Y., et al "Synthesis of Beta–SiAlON from a Montmorillonite–Polyacrylonitrile Intercalcation Compound by Carbothermal Reduction" J. Am.Ceram.Soc. v. 67, No. 11 (1984).

Primary Examiner—Karl Group
Attorney, Agent, or Firm—E. Philip Koltos

[57] ABSTRACT

A process for the synthesis of homogeneous advanced ceramics such as SiC+AlN, SiAlON, SiC+Al$_2$O$_3$, and Si$_3$N$_4$+AlN from natural clays such as kaolin, halloysite and montmorillonite by an intercalation and heat treatment method. Included are the steps of refining clays, intercalating organic compounds into the layered structure of clays, drying the intercalated mixture, firing the treated atmospheres and grinding the loosely agglomerated structure. Advanced ceramics produced by this procedure have the advantages of homogeneity, cost effectiveness, simplicity of manufacture, ease of grind and a short process time. Advanced ceramics produced by this process can be used for refractory, wear part and structure ceramics.

23 Claims, No Drawings

PROCESS FOR PRODUCING ADVANCED CERAMICS

GOVERNMENT INTEREST

The invention described herein may be manufactured, used, and licensed by or for the Government for governmental purposes without the payment to me of any royalty thereon.

BACKGROUND OF THE INVENTION

1. Field of the Invention

This invention pertains to a method for producing homogeneous advanced ceramics materials from abundant, low cost, natural clays by intercalation and heat treatment. These composite materials can be used for wear parts, heat exchangers, refractories and the like. Advanced ceramics play an important role in replacing critical and strategic minerals.

2. Description of the Prior Art

Carbides and nitrides have excellent properties such as high hardness, high thermal conductivity, good heat resistance, good thermal shock resistance, high mechanical strength, and good chemical stability. These properties have brought about their use as advanced ceramic materials. Most high strength advanced ceramics contain the elements of silicon, aluminum, oxygen, nitrogen, and/or carbon. One of these advanced ceramic materials is SiC and there are several known methods used to produce it including direct reaction of silicon with carbon; carbothermal reduction of silica with carbon; vapor phase reaction of hydrocarbon with silicon tetrachloride or silicon tetrahydrogenate; and thermal decomposition of organic silicon polymer. Similarly, there are several methods used to produce silicon/aluminum nitrides. These include direct nitridation of silicon/aluminum with nitrogen; a vapor phase reaction between silicon/aluminum halides and ammonia; a reaction between silica/alumina and ammonia; and carbothermal reduction and nitridation of silica/alumina with nitrogen.

Pure carbides and nitrides are very difficult to densify by sintering. Usually, the addition of a sintering aid is necessary to promote densification. These additions, however, will degrade the performance of the ceramic material at high temperature. The use of the carbide or nitride particles with another phase to make composites such as $SiC+Al_2O_3$, and $SiC+AlN$ and solid solutions including SiAlON and SiC.AlN are other ways to have dense sintered products and to improve ceramic performance at high temperature. It has now been found that these composites and solid solutions can be synthesized at low cost by carbothermal reduction and/or nitridation of clays in inert gases and/or a nitrogen atmosphere.

I. B. Cutler, et al in "Sinterable SiAlON Powder by Reaction of Clay with Carbon and Nitrogen" American Ceramic Society Bulletin, v. 58, No. 9 (1979) reported mixing kaolin, carbon black, and a catalyst of 1 percent iron together and fired the mixture at a temperature close to 1,450° C. to synthesize SiAlON. This method has serious drawbacks since the iron catalyst will react with silicon to form iron silicides and physical mixing limits structural homogeneity which is critical to making substantially pure SiAlON. No matter how good the dispersion is, the homogeneity of a mixture resulting from physical mixing still is limited by the particle size. Iron silicides melt at about 1,200° C. to 1,500° C. and are detrimental to the high temperature performance of the SiAlON.

A. C. D. Chaklader et al, "$Al_2O_3$-SIC Composites from Aluminosilicate Precursors" in the J. of American Ceramic Society v. 75, No. 8 (1992) reported mixing aluminosilicate and carbon in stoichiometric proportions and firing the mixture above 1,550° C. in Ar gas to obtain a $SiC+Al_2O_3$ composite. The SiC morphology of the fired material was related to the morphology of the starting carbon source. For example, by adding graphite fiber, a SiC fiber would be synthesized. Spherical SiC particles would be synthesized from spherical graphite particles. Instead of physical mixing, C. Kato, et al, Communications of the American Ceramic Society, Vol. 67 No. 11, 1984, reported synthesizing Beta-SiAlON from montmorillonite that was intercalated with polyacrynitrile and reduced carbothermally. Montmorillonite was treated with 0.01 to 0.02N hexylammonium hydrochloride solution three times and immersed and intercalated with an acrylonitrile monomer for 24 hours. The complex was then heated at 50° C. for 24 hours to polymerize the acrylonitrile. The intercalation compound was then further heat treated for cyclization of polyacrynitrile in air at 220° C. for 48 hours, then fired to 1,150° C. to get SiAlON along with beta-SiC and AlN. The drawbacks of this method are the long process time, acrylonitrile toxicity, and its expense.

U.S. Pat. No. 4,652,436 describes a method for making nitrides and carbides by intercalating a monomer or prepolymer into the interlamellar space of a natural mineral. The intercalated clay-monomer or prepolymer complex had several heat treatments at a temperature range from 80° to 250° C. for over 52 hours in order to polymerize the monomer and to acquire flame resistant properties. The intercalated clay polymer complex was then processed at a temperature ranging from 1,100° to 1,700° C. under a nitrogen or reducing atmosphere. The synthetic carbide and nitride materials disclosed in this patent include silicon carbides, titanium carbide, vanadium carbide, silicon nitride, aluminum nitride, molybdenum nitride, and SiAlON. This patent does not show the production of useful ceramic materials. The materials synthesized from clays were a mixture of SiC, $Si_3N_4$, and SiAlON. Useful ceramic materials require suitable physical and chemical properties of each phase such as thermal expansion, thermal resistance, corrosion resistance, etc. Useful ceramic raw materials do not contain so many phases.

The composites of SiC and $Al_2O_3$, and of SiC and AlN along with the solid solutions of SiAlON and of SiC.AlN are typical useful ceramic materials. They can be synthesized from the mixture of clays and carbon by heat treatment through carbothermal reaction and/or nitridation reaction. To produce useful raw materials for ceramic processing requires precise composition control of the carbon and clay mixture. In U.S. Pat. No. 4,652,436, carbon was derived from the decomposition of a polymer and the polymer was derived from the polymerization of a monomer by the use of an initiator or a catalyst at a low temperature range from 80° to 250° C. for over 52 hours.

Clays are also known to be catalysts (see A. C. D. Newman 1987 "Chemistry of Clays and Clay Minerals"). However, clays have variable compositions, impurities, and surface conditions. These factors cause the transformation of the polymer to carbon to be less reproducible or difficult to control (see D. H. Solomon and M. J. Rosser 1965 "Reactions Catalyzed by Minerals. Part I polymerization of Styrene" J. of Applied Polymer Science). In addition, a wide range of molecular weight can be produced during polymerization, causing difficulty in reproducing and controlling carbon concentration for later carbonization reaction and carbothermal reduction. Also, the polymerization process of U.S. Pat. No. 4,652,436 takes over 52 hours to complete and requires two filtration steps to remove chemicals. This increases the technical difficulties for his process, making it difficult to use commercially.

U.S. Pat. No. 4,652,436 uses polymers to derive carbon. Less controllable carbon concentration and long polymerization process time are drawbacks in the disclosure of U.S. Pat. No. 4,652,436. Polymerization is not a process step in this invention. Therefore, no process time is required for polymerization and carbon concentration is reproducible and easy to control. Also useful ceramic composites and/or solid solutions were synthesized. This invention represents an improvement because 1) it has increased the flexibility to include a wide variety of intercalated chemicals irrespective of their volatility; 2) intercalation for synthesis of advanced ceramics can be done in an aqueous media; 3) the process time to produce advanced materials is short compared to U.S. Pat. No. 4,652,436; 4) dehydrated clays can be intercalated and synthesized to produce advanced ceramic composites and solid solutions; 5) the concentration of carbon is reproducible and easy controllable.

The present invention therefore provides an improved process for the synthesis of advanced ceramics, such as SiC+AlN, SiAlON, SiC+$Al_2O_3$ and $Si_3N_4$+AlN from natural clays such as kaolin, halloysite, and montmorillonite by an intercalation and heat treatment method. Advanced ceramics produced by this process are low cost and highly homogeneous, i.e. nanostructured materials made using a simple manufacturing process. The product can be easily ground and requires a short synthesis time. The advanced ceramics produced by the process of this invention can be used in refractory ceramic and/or structured ceramic applications such as wear parts.

SUMMARY OF THE INVENTION

The invention provides a process for producing substantially homogeneous ceramic materials which comprises:
(a) forming a mixture by dispersing an intercalation composition comprising at least one compound selected from the group consisting of carbon containing compounds and nitrogen containing compounds into the interlamellar spaces of a clay;
(b) drying the mixture; and
(c) heating in an inert or a reducing atmosphere for a sufficient time and at a temperature of at least the carbothermal reduction temperature of the mixture to produce a substantially homogeneous ceramic material.

DETAILED DESCRIPTION OF THE PREFERRED EMBODIMENT

The performance of ceramic materials is determined in part by microstructure and composition. Homogeneity, agglomeration, and grain growth are three factors that influence the finished microstructure in ceramic manufacturing processes. The homogeneous distribution of materials is always a problem in ceramic manufacturing processes. Clays are naturally occurring minerals with a layered structure. They may absorb some types of guest molecules in their interlayer space. These guest molecules may contain organic carbon that supports the carbothermal reductions that are necessary to transform clay into advanced ceramic raw materials. For the purpose of this invention, carbothermal reduction means the reaction of carbon with oxide material to form a carbide material. The absorption of these compounds into the clay structure is a nanocomposite processing route for the production of microstructurally homogeneous ceramic composites on a nanometer scale.

Advanced ceramics such as SiC+AlN composites, SiAlON, SiC+$Al_2O_3$ composite, and $Si_3N_4$+AlN composites, are synthesized by the reaction of clays and carbon in a controlled atmosphere. The homogeneity of the mixture of carbon and clay plays an important role for the synthesis and purity of advanced ceramics compounds. Intercalation offers a novel route for producing nanocrystalline ceramics/composites by controlling the intercalation of clay particles with "guest" molecules on a nanometer scale.

Because intercalation is related to the interlayer surface condition of clays, clay interlayer surfaces are modified by dehydration which removes the crystalline water out of the interlayer surface. The effect of the hydroxide bond of the interlayer surface on intercalation was also investigated by comparing the intercalation behavior of dehydrated and hydrated kaolin.

Natural clays include kaolin, halloysite, montmorillonite, etc. Montmorillonite has a higher ion exchange capacity than kaolin and halloysite and swells by absorbing water. Because of this, montmorillonite may be easily intercalated. It is known in the art that kaolin and halloysite have been intercalated after the treatment of an entraining agent such as dimethyl sulfoxide, hydrazine or formid (see Theng, B. K. G. (1974) The Chemistry of Clay-Organic polymer Complexes: Elsevier, Amsterdam.).

"Guest" molecules are required to supply enough carbon to perform carbothermal and/or nitridation reactions for the synthesis of advanced ceramics. Organic molecules can transform to carbon by the heating under reducing conditions (carbonization). Low molecular weight paraffins, olefines, and aromatics will volatilize first, followed by the evolution of $CO_2$, $CH_4$, CO, and $H_2$ during the carbonization reaction. By 900° C. the carbonization reaction of organic molecules is complete and residual carbon is left.

Because of the large quantity of volatiles that occurs from most organic materials used for intercalation during carbonization, not enough residual carbon remains to support carbothermal reaction. This limits the selection of organic material for intercalation. This limitation can be overcome by using two chemicals with different functions. The intercalation chemical opens the interlayer space of clays, the other chemical supplies additional carbon and carbonizes at a temperature lower than the evaporation temperature of the intercalation chemical, allowing more carbon to deposit in the clay interlayer. Reactions with residual carbon form carbides, nitrides, carbonitride, and oxynitride by carbothermal reduction and/or nitridation of clays in a nitrogen or inert atmosphere. In addition, the carbon concentration is easier to control and is reproducible because no polymerization step is involved.

Clays contain impurities such as alkali, alkaline, and iron compounds. The alkali and alkaline compounds in the clays can be volatilized during carbothermal reaction. However, iron compounds will react with silicon compounds to form iron silicides during carbothermal reaction. These compounds melt from 1,200° to 1,500° C. and are detrimental to the high temperature performance of advanced ceramics. Iron can be eliminated by the removal of iron materials before intercalation by washing, magnetic separation, chemical solution, flotation and electrodialysis methods.

Clays have a wide range of chemical compositions depending on their type and the purity. The heat treatment to synthesize advanced ceramic composites or solid solutions from clay is a function of temperature, soak time, carbon concentration, gas environment, and clay composition. All of these variables interact in their effect on the final product composition. For example, increased carbon concentration may increase carbide amount but may decrease the synthesis temperatures or the soak times necessary to produce the same advanced ceramic composites. This invention has the following advantages: 1) the residual carbon in the interlayer of clay can react with Al or Si on an atomic scale to synthesize advanced ceramic composites and/or solid solutions; 2) microstructurally homogeneous composites can be synthesized; 3) synthesis cost is reduced in terms of material, firing and milling cost; 4) and whiskers and fibers can be synthesized in situ.

As a first step in the process, one forms a mixture by dispersing an intercalation composition comprising at least one compound selected from the group consisting of carbon containing compounds and nitrogen containing compounds into the interlamellar spaces of a clay. This mixing can be done at from about 10° C. to about 100° C. Preferably the clay is a natural clay such as montmorillonite, kaolin, kaolinite, halloysite, vermiculite, illite, sepiolite, palygorskite, attapulgite and chlorite. The mixture is then dried to remove water. Any suitable drying method can be used as long as a dry and homogeneous mixture is attained. One such method is spray drying. The drying is preferably conducted at a temperature of from about 50° C. to about 600° C. more preferably from about 80° C. to about 140° C. and most preferably from about 90° C. to about 110° C. Preferably the drying is conducted for from about a few minutes to about 48 hours. The drying time can readily be determines by those skilled in the art, and depends on particle size, droplet size and composition of materials. Usually, although not necessarily, the drying is conducted in an air or inert atmosphere. In a most preferred case, one next conducts a grinding of the dried mixture. Next, the process carbonizes the dried, ground mixture. This may be done, for example, at a temperature of about 500° C. to about 900° C. in a low temperature furnace for a time sufficient to effect carbonizing. A low temperature furnace is used to avoid the volatiles that may contaminate the expansive high temperature furnace. This may be conducted in an argon or $N_2$ atmosphere.

Next, the resulting product is cooled to about room temperature, and then heated in an inert or a reducing atmosphere for a sufficient time and at a temperature of at least the carbothermal reduction temperature of the mixture to produce a substantially homogeneous ceramic material. This heating step is conducted at a temperature of at least about 1,300° C., and preferably from about 1,300° C. to about 2,000° C. This heating step is conducted for from about 0.5 hours to about 4 hours, more preferably for from about 0.5 to about 2 hours, and most preferably for from about 0.5 to about 1 hour. It is conducted in an atmosphere comprising at least one component selected from the group consisting of $N_2$, $NH_3$ and argon. This latter step may be conducted in one or more than one stages in the same or different inert or reducing atmospheres.

The composition mixed with the clay comprises an intercalation component which serves to open the interlayer space of the clays. Most preferably this is an alkylamine such as dodecylamine. The intercalation component preferably present in an amount of from about 30% to about 200% by weight of the clay component. A more preferred range is from about 50% to about 150% and most preferably from about 75% to about 100%.

The mixture also comprises a diffusing component for carbothermal reduction and/or nitridation. In the preferred embodiment the diffusing component is a soluble organic material as a carbon source such as a carbohydrate, for example sucrose, pentose, glucose and fructose and the like.

The diffusing component is preferably present in an amount of from about 50% to about 200% by weight of the clay component. A more preferred range is from about 60% to about 180% and most preferably from about 70% to about 140%.

The mixture may be formed with a suitable amount of an organic or inorganic solvent. The mixture may also contain an acid such as HCl and acetic acid. The acid is preferably present in an amount of from about 20% to about 500% by weight of the clay component.

The following non-limiting examples serve to illustrate the invention.

EXAMPLE 1

1 g of dodecylamine was mixed in a beaker containing 5 cc of 36.5 percent HCl and 10 cc water by a teflon coated magnetic stirrer until the dodecylamine was dissolved in the solution. 0.7 g sugar was added to the mixture. This mixture was then stirred until the sugar dissolved. 1 g kaolin was added to the mixture, stirred and ultrasonically mixed until the mixture gelled. The mixture was kept in a dryer at 110° C. in air until dry. The dried mixture was ground into a fine powder (200 mesh), fired in a furnace at 750° C. for 1 hour in $N_2$ gas, then cooled to room temperature. This step was done to remove the possibility of contamination of the high temperature furnace. The mixture was put into a high temperature furnace in $N_2$ gas atmosphere and fired at 1,500° C. for 4 hours to obtain a SiC+AlN composite as evidenced by X-ray diffraction analysis. The fired powder was easily ground by mortar and pestle to less than 2 micrometers.

The intercalated solution was prepared by adding 1 g of dodecylamine to 5 cc HCl, 10 cc water, and 0.6 to 1 g table sugar. One gram of clay was mixed into the above solution using a teflon coated magnetic stirrer and an ultrasonic probe. The ultrasonic probe assisted in mixing the clay-dodecylamine-hydrochloride-sugar intercalation materials. After treating materials with the intercalation solution, the kaolin and halloysite basal spacing increased from 7.14 angstroms to 34 angstroms, montmorillonite basal spacing increased from 15.7 angstroms to 17.7 angstroms, and dehydrated kaolin basal spacing increased from 7.14 angstroms to 8.9 angstroms. The increased basal spacing showed that the dodecylamine-hydrochloride-sugar was intercalated into the interlamellar spaces of clays at room temperature.

As is known in the art, an entraining agent such as dimethyl sulfoxide, hydrazine, or formid was necessary to achieve intercalation of kaolin and halloysite. However, kaolin and halloysite were intercalated by dodecylamine-HCl complex without the entraining agent in this invention. In addition, it was observed that kaolin and halloysite have more swelling ability than montmorillonite in this system. The results also indicated that the dehydrated clays can be intercalated by dodecylamine-HCl complex.

In order to synthesize advanced ceramic composites, the above compounds were fired in a nitrogen or in a reducing atmosphere at temperatures over 1,400° C. Because of this, it is necessary to understand the effect of temperature on intercalation chemicals, especially between about 500° and 900° C. in nitrogen and reducing atmosphere. A small peak at low diffraction angle in a X-ray diffraction scan confirmed that clays remained intercalated at the temperature between 500° to 900° C.

Surface area and density measurement gave additional evidence of the existence of intercalation in the temperature range of from about 500° C. to about 900° C. The surface area of kaolin, dehydrated kaolin, and intercalated kaolin were measured by BET. Kaolin and dehydrated kaolin had a surface area about 15 m$^2$/g, intercalated kaolin after heat treatment at 600° C. in N$_2$ gas for 1 hour had a surface area of 46.36 m$^2$/g. The above treated samples, after decarbonization at 500° C. for 1 hour in air, had a surface area of 73.96 m$_2$/g. Intercalated dehydrated kaolin, after heat treatment at 600° C. in N$_2$ gas for 1 hour, had a surface area of 105.24 m$^2$/g. This surface area increased to 166.85 m$^2$/g after decarbonization in air at 500° C. for 1 hour. These results are summarized in Table I. Several other tests were conducted to understand the reason for increased surface area. The results indicated that the surface area increase can be only explained by intercalation of the clay structure. In addition, the intercalated dehydrated kaolin has higher surface area than kaolin.

TABLE 1

| Materials | Surface area, m$^2$/g |
| --- | --- |
| Kaoling (untreated) | 15 |
| Dehydrated kaolin | 15 |
| Intercalated kaolin + 600° C. N$_2$ for 1 hr. | 46.36 |
| Intercalated kaolin + 600° C. N$_2$ for 1 hr. + 500°C. air 1 hr. | 73.96 |
| Intercalated dehydrated kaolin + 600° C. N$_2$ for 1 hr. | 105.24 |
| Intercalated dehydrated kaolin + 600° C. N$_2$ for 1 hr. 500° C. air for 1 hr. | 166.85 |

The density of kaolin, dehydrated kaolin, and intercalated kaolin were measured by a helium autopycnometer. Density for each of the clays measured by this method was close to theoretical. Kaolin had a density of about 2.8 g/cc and dehydrated kaolin had a density of about 2.5 g/cc. Intercalated kaolin after heat treatment at 500° C. in N$_2$ for 1 hour had a density of about 2.4 g/cc. When the intercalated kaolin was decarbonized at 500° C. for 3 hours in air, the density was 2.8 g/cc. The following Table II summarizes the above results. A comparison between decarbonized intercalated kaolin and dehydrated kaolin indicates that the increased density was caused by increased basal spacing. Increased basal spacing permit more gas to penetrate inside the structure and increased the measured density of decarbonized intercalated kaolin.

TABLE 2

| Materials | Density, g/cc |
| --- | --- |
| Kaolin | 2.82 |
| Dehydrated kaolin | 2.5 |
| Intercalated kaolin + 500° C. N$_2$ for 1 hr. | 2.4 |
| Intercalated kaolin + 500° C. N$_2$ for 1 hr. + 500° C. air for 3 hrs. | 2.87 |

EXAMPLE 2

1 g dodecylamine was mixed in a beaker containing 5 cc of 36.5 percent HCl and 10 cc water by a teflon coated magnetic stirrer until the dodecylamine was dissolved in the solution. 0.7 g sugar was added to the mixture. This mixture was then stirred until the sugar dissolved. 1 g halloysite was added to the mixture, stirred and ultrasonically mixed until the mixture gelled. The mixture was kept in a dryer at 110° C. in air until dry. The dried mixture was ground into a fine powder (200 mesh), fired in a furnace at 750° C. for 1 hour in N$_2$ gas, then cooled to room temperature. This step was done to remove the possibility of contamination of the high temperature furnace. The mixture was put into a high temperature furnace in N$_2$ gas atmosphere and fired at 1,500° C. for 4 hours to obtain a SiC+AlN composite as evidenced by X-ray diffraction analysis.

EXAMPLE 3

1 g dodecylamine was mixed in a beaker containing 5 cc of 36.5 percent HCl and 10 cc water by a teflon coated magnetic stirrer until the dodecylamine was dissolved in the solution. 0.7 g sugar was added to the mixture. This mixture was then stirred until the sugar dissolved. 1 g montmorillonite was added to the mixture, stirred and ultrasonically mixed until the mixture gelled. The mixture was kept in a dryer at 110° C. in air until dry. The dried mixture was ground into a fine powder (200 mesh), fired in a furnace at 750° C. for 1 hour in N$_2$ gas, then cooled to room temperature. This step was done to remove the possibility of contamination of the high temperature furnace. The mixture was put into a high temperature furnace in N$_2$ gas atmosphere and fired at 1,500° C. for 4 hours to obtain a SiC+AlN composite as evidenced by X-ray diffraction analysis. In addition, SiC whiskers were observed by SEM and TEM.

EXAMPLE 4

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g halloysite was added to the mixture, stirred and ultrasonically mixed until the mixture gelled. The mixture was kept in a dryer at 110° C. in air until dry. The dried mixture from step 4 was ground into a fine powder (200 mesh), fired in a furnace at 750° C. in N$_2$ gas for 1 hour, then cooled to room temperature. This step was done to remove the possibility of contamination of the high temperature furnace. The mixture was put into a high temperature furnace in N$_2$ gas and fired at 1,450° C. for 2 hours to obtain a Beta-SiAlON (Si$_3$Al$_3$O$_3$N$_5$) as evidenced by X-ray diffraction analysis.

EXAMPLE 5

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g montmorillonite was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in N$_2$ gas for 1 hour, then cooled to room temperature. This step was done to remove the possibility of contamination of the high temperature furnace. The mixture was put into a high temperature furnace in N$_2$ gas and fired at 1,450° C. for 2 hours to obtain a mixture of Beta-SiAlON (Si$_3$Al$_3$O$_3$N$_5$) and Si$_{1.8}$Al$_{0.2}$O$_{1.2}$N$_{1.8}$ as evidenced by X-ray diffraction analysis.

EXAMPLE 6

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g kaolin was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in Ar gas and fired at 1,550° C. for 1 hour to obtain a $SiC+Al_2O_3$ composite as evidenced by X-ray diffraction analysis. In addition, SiC whiskers were observed by SEM and TEM.

EXAMPLE 7

1 g dodecylamine was mixed an a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g halloysite was added to the mixture, stirred and ultrasonically mixed until the mixture gelled. The mixture from was kept in a dryer at 110° C. in air until dry. The dried mixture from was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in Ar gas and fired at 1,550° C. for 1 hour to obtain a $SiC+Al_2O_3$ composite as evidenced by X-ray diffraction analysis.

EXAMPLE 8

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g montmorillonite was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in Ar gas and fired at 1,550° C. for 1 hour to obtain a $SiC+Al_2O_3$ composite as evidenced by X-ray diffraction analysis.

EXAMPLE 9

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g montmorillonite was added to the mixture, stirred and ultrasonically treated until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in $N_2$ gas and fired at 1,450° C. for 4 hours to obtain a $Si_3N_4+AlN$ composite as evidenced by X-ray diffraction analysis.

EXAMPLE 10

This example is similar to that of Examples 1, 2, and 3, however, the treatment temperature was changed.

1 g dodecylamine was mixed in a beaker containing 5 cc of 36.5 percent HCl and 10 cc water by a teflon coated magnetic stirrer until the dodecylamine was dissolved in the solution. 0.7 g sugar was added to the mixture. This mixture was then stirred until the sugar dissolved. 1 g clay (such as kaolin, halloysite, or montmorillonite) was added to the mixture, stirred and ultrasonically mixed until the mixture gelled. The mixture from was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into furnace in $N_2$ gas and fired at 1,600° C. for 1 hour to obtain a SiC+AlN composite as evidenced by X-ray diffraction analysis.

EXAMPLE 11

This example is similar to Example 1, however, the HCl was replaced by acetic acid. After treating materials to the intercalation solution, the kaolin basal spacing increased from 7.14 angstroms to 33.8 angstroms, dehydrated kaolin basal spacing increased from 7.14 angstroms to 35.7 angstroms. The sugar concentration was increased to 1 g.

1 g dodecylamine was mixed in a beaker containing 1 cc of 36.5 percent HCl, 1.6 cc of 99.8 percent acetic acid and 6 cc water by a teflon coated magnetic stirrer until the dodecylamine was dissolved in the solution. 1 g sugar was added to the mixture. This mixture was then stirred until the sugar dissolved. 0.86 g dehydrated kaolin was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in $N_2$ gas and fired above 1,600° C. for 1 hour to obtain a SiC+AlN composite as evidenced by X-ray diffraction analysis.

EXAMPLE 12

This example is similar to Example 10, however, the gas environment was changed to 50 volume percent Ar and 50 volume percent $N_2$.

1 g dodecylamine was mixed in a beaker containing 5 cc 36.5 percent HCl and 10 cc water by a teflon coated magnetic stirrer until the dodecylamine was dissolved in the solution. 1 g sugar was added to the mixture. This mixture was then stirred until the sugar dissolved. 1 g kaolin or 0.86 g dehydrated kaolin was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in 50% $N_2$ and 50% Ar gases and fired at 1,600° C. for 1 hour to obtain a mixture of SiC, AlN, and $Al_2O_3$ as evidenced by X-ray diffraction analysis.

EXAMPLE 13

This example is similar to Example 12, however, the gas environment was added in two stages. $N_2$ was first added into the furnace from room temperature to 1,500° C. where it was held for 30 minutes. Ar was then added and the temperature increased to 1,550° C. where it was held for 30 additional minutes. It demonstrated that the synthesis temperature and synthesis time to produce SiC+AlN could be decreased by the using a two stage gas firing.

1 g dodecylamine was mixed in a beaker containing 5 cc of 36.5 percent HCl and 10 cc water by a teflon coated magnetic stirrer until the dodecylamine was dissolved in the solution. 1 g sugar was added to the mixture. This mixture was then stirred until the sugar dissolved. 0.86 g dehydrated kaolin was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was heated in a high temperature furnace in $N_2$ gas first up to the temperature of 1,500° C. where it was held for 30 minutes. The gas was then switched to Ar gas and the temperature was increased to 1,550° C. for 30 minutes to obtain a SiC+AlN composite as evidenced by X-ray diffraction analysis.

EXAMPLE 14

This example is similar to Examples 1, 2, and 3, however the high temperature firing at 1,500° C. in $N_2$ gas was changed to $NH_3$ and the soaking time was decreased to 1 hour.

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g kaolin was added to the mixture, stirred and ultrasonically mixed until mixture gelled. The mixture was kept in a dryer at 110° C. in air until dry. The dried mixture was ground into a fine powder (200 mesh), fired in a furnace at 750° C. in $N_2$ gas for 1 hour, then cooled to room temperature. This step was done to remove the possibility of contamination of the high temperature furnace. The mixture was put into a high temperature furnace in $NH_3$ gas and fired at 1,500° C. for 1 hour to obtain a SiC+AlN and SiAlON ($Si_3Al_3O_3N_5$) composite as evidenced by X-ray diffraction analysis.

EXAMPLE 15

This example is similar to Examples 1, 2, and 3 however, the firing temperature, soak time and sugar concentration were varied in order to produce composites in the Si—Al—C—O—N system.

1 g dodecylamine was mixed in a beaker containing 5 cc of 36.5 percent HCl and 10 cc water by a teflon coated magnetic stirrer until the dodecylamine was dissolved in the solution. 0.6 g sugar was added to the mixture. This mixture was then stirred until the sugar dissolved. 1 g clay (kaolin, halloysite, or montmorillonite) was added to the mixture, stirred and ultrasonically mixed until the mixture gelled. The mixture was kept in a dryer at 110° C. in air until dry. The dried mixture was ground into a fine powder (200 mesh), fired in a furnace at 750° C. in $N_2$ gas for 1 hour, then cooled to the room temperature. This step was done to remove the possibility of contamination of the high temperature furnace. The mixture was put into a high temperature furnace in $N_2$ gas and fired above 1,500° C. for 1 hour to obtain a mixture of SiC, AlN, $Al_2O_3$ and SiAlON as evidenced by X-ray diffraction analysis.

What is claimed is:

1. A process for producing substantially homogeneous ceramic materials which comprises
   (a) forming a mixture by dispersing an intercalation composition comprising a solution of one or more carbohydrate compounds into the interlamellar spaces of a clay;
   (b) drying the mixture; and
   (c) heating in an inert or a reducing atmosphere for a sufficient time and at a temperature of at least the carbothermal reduction temperature of the mixture to produce a substantially homogeneous ceramic material.

2. The process of claim 1 wherein the ceramic material produced is selected from the group consisting of SiC+AlN, SiAlON, SiC+$Al_2O_3$, and $Si_3N_4$+AlN.

3. The process of claim 1 wherein the clay is a natural clay.

4. The process of claim 1 wherein the natural clay is selected from the group consisting of montmorillonite, kaolin, kaolinite, halloysite, vermiculite, illite, sepiolite, palygorskite, attapulgite and chlorite.

5. The process of claim 1 wherein step (a) is conducted at from about 10° C. to about 100° C.

6. The process of claim 1 wherein the drying of step (b) is conducted at a temperature of from about 50° C. to about 600° C.

7. The process of claim 1 wherein the drying of step (b) is conducted for from about several minutes to about 48 hours.

8. The process of claim 1 wherein the drying of step (b) is conducted in an inert atmosphere.

9. The process of claim 1 comprising the further step of grinding the dried mixture resulting from step (b) before conducting step (c).

10. The process of claim 1 comprising the further step of cooling the mixture resulting from step (b) to about room temperature before conducting step (c).

11. The process of claim 1 wherein the heating of step (c) is conducted at a temperature of at least about 1,300° C.

12. The process of claim 1 wherein the heating of step (c) is conducted for from about 0.5 hours to about 4 hours.

13. The process of claim 1 wherein the heating of step (c) is conducted in an atmosphere comprising at least one component selected from the group consisting of $N_2$, $NH_3$ and argon.

14. The process of claim 1 wherein heating of step (c) is conducted at a temperature of from about 1,300° C. to about 2,000° C.

15. The process of claim 1 wherein the intercalation composition comprises an alkylamine.

16. The process of claim 1 wherein the mixture comprises at least one diffusing component which is a carbon source.

17. The process of claim 1 wherein the one or more carbohydrate compounds is selected from the group consisting of sucrose, pentose, glucose and fructose.

18. The process of claim 1 wherein the mixture comprises at least one organic or inorganic acid solvent.

19. The process of claim 18 wherein the mixture comprises at least one acid solvent selected from the group consisting of HCl and acetic acid.

20. The process of claim 1 wherein the heating of step (c) is conducted in two stages in two different inert or reducing atmospheres.

21. The process of claim 20 wherein the heating of step (c) is conducted in two stages in two different inert or reducing atmospheres, each of which atmosphere comprises at least one component selected from the group consisting of $N_2$, $NH_3$ and argon.

22. The process of claim 1 comprising the further step of removing iron compounds from the clay.

23. The process of claim 1 wherein the mixture further comprises dodecylamine.

\* \* \* \* \*